United States Patent
Sir et al.

(10) Patent No.: US 6,814,790 B2
(45) Date of Patent: Nov. 9, 2004

(54) MULTICOLOR DYE SET AND INKJET INK COMPOSITION WITH HIGH CHROMA

(75) Inventors: In-Shan Sir, Kaohsiung (TW); Chia-Hsin Chien, Taoyuan (TW); Yu-Ting Lin, Lujou (TW)

(73) Assignee: Benq Corporation, Taoyuan (TW)

(*) Notice: Subject to any disclaimer, the term of this patent is extended or adjusted under 35 U.S.C. 154(b) by 0 days.

(21) Appl. No.: 10/322,256

(22) Filed: Dec. 17, 2002

(65) Prior Publication Data

US 2003/0116056 A1 Jun. 26, 2003

(30) Foreign Application Priority Data

Dec. 21, 2001 (TW) .......................... 90131932 A

(51) Int. Cl.[7] .................. C09D 11/02; C09B 67/22
(52) U.S. Cl. .................. 106/31.27; 106/31.43; 106/31.49; 106/31.48; 106/31.5; 8/638
(58) Field of Search .................. 106/31.27, 31.43, 106/31.48, 31.49, 31.5; 8/638

(56) References Cited

U.S. PATENT DOCUMENTS

| | | | |
|---|---|---|---|
| 4,334,878 A | 6/1982 | Cutler et al. .................. 524/88 |
| 4,559,059 A | * 12/1985 | Su .................. 8/507 |
| 4,631,085 A | 12/1986 | Kawanishi et al. ...... 106/31.48 |
| 4,713,113 A | 12/1987 | Shimada et al. .......... 106/31.5 |
| 4,737,190 A | 4/1988 | Shimada et al. ......... 106/31.48 |
| 5,108,504 A | 4/1992 | Johnson et al. ............... 106/25 |
| 5,451,251 A | * 9/1995 | Mafune et al. .......... 106/31.48 |
| 5,560,766 A | 10/1996 | Gundlach .................. 106/22 R |
| 5,601,639 A | 2/1997 | Myers et al. ............. 106/31.27 |
| 5,997,623 A | 12/1997 | Lin .......................... 106/31.58 |
| 5,743,945 A | 4/1998 | Yamashita et al. ........ 106/31.58 |
| 5,749,951 A | 5/1998 | Yoshiike et al. .......... 106/31.27 |
| 5,766,326 A | 6/1998 | Gundlach et al. ......... 106/31.47 |
| 5,772,743 A | 6/1998 | Gundlach et al. ......... 106/31.27 |
| 5,925,177 A | 7/1999 | Carreira et al. .......... 106/31.43 |
| 5,980,623 A | 11/1999 | Hiraoka et al. ........... 106/31.49 |
| 6,054,505 A | 4/2000 | Gundlach et al. ............ 523/160 |
| 6,698,875 B2 * | 3/2004 | Onishi et al. ................ 347/100 |
| 2002/0005884 A1 * | 1/2002 | Onishi et al. ................ 347/100 |
| 2002/0147251 A1 * | 10/2002 | Ohta et al. .................. 523/161 |
| 2003/0127018 A1 | 7/2003 | Shen et al. ............... 106/31.27 |
| 2003/0136299 A1 | 7/2003 | Chien et al. .............. 106/31.27 |
| 2003/0164114 A1 * | 9/2003 | Kitayama et al. ......... 106/31.46 |

FOREIGN PATENT DOCUMENTS

| | | |
|---|---|---|
| EP | 0 059 827 | 6/1985 |
| JP | 59001580 A | 1/1984 |
| JP | 62-25717 A | 8/1987 |
| JP | 61-76677 A | 8/1996 |
| WO | 99/55955 | 11/1999 |

OTHER PUBLICATIONS

Derwent abstract for CN 1434085 A, 2 pages total (Aug. 2003).

* cited by examiner

Primary Examiner—Helene Klemanski
(74) Attorney, Agent, or Firm—Ladas & Parry

(57) ABSTRACT

Multicolor dye set with high chroma and broad color space. The dye set of the present invention is suitable for color inkjet printing and includes (1) Direct Blue 199 dye, Acid Blue 9 dye, and Direct Blue 87 dye; (2) Reactive Red 158 dye, Reactive Red 159 dye, and Acid Red 92 dye; and (3) Acid Yellow 23 dye and Direct Yellow 86 dye. The dye set of the present invention has light-fastness and water-fastness when used in thermal bubble inkjet printers. In addition, the dye set has special viscosity, good surface tension, broad color space, and high quality color image, greatly improving printing properties.

25 Claims, 3 Drawing Sheets

--- HP —— Epson --- Lexmark —— Present Invention

MULTICOLOR DYE SET AND INKJET INK COMPOSITION WITH HIGH CHROMA

BACKGROUND OF THE INVENTION

1. Field of the Invention

The present invention relates to a multicolor dye set with high chroma and an inkjet ink composition using the dye set.

2. Background of the Invention

Color ink for color inkjet printing requires a wide color range and ideal color matching. A primary dye set includes cyan ink, magenta ink, yellow ink, and black ink. A secondary dye set includes other colorants obtained from combining the dyes of the primary dye set.

A successful ink composition for color inkjet printing must meet the following requirements: good crusting resistance, good stability, proper viscosity, proper surface tension, high color saturation, little color-to-color bleed, and rapid dry time. In addition, a successful ink composition can be ejected onto plain paper without kogation.

Color can be specified by two systems: color appearance system and color mixing system. Color appearance system is a system obtained from collecting data of actual colored objects and systematically generalizing the data. Examples include the Ostwald color system, the Munsell color system, and the DIN color system. Color mixing system is based on the principle that primary color stimuli can be matched to generate various colors. Presently, the most important color mixing system is the CIE colorimetric system, which measures color instrumentally. For example, the Munsell color system was developed by Munsell, an American painter, and is the most famous system, describing color by hue, value, and chroma. For the CIE colorimetric system, the color stimuli (stimuli X, Y, and Z) and sensation of color are caused by the incorporation of light sources, objects, and observers. Color space is defined by three values $L^*$, $a^*$, and $b^*$. $L^*$ indicates the lightness of a color, $a^*$ the hue, and $b^*$ the chroma of a color. $a^*$ ranges from $-a$ (green) to $+a$ (red), and $b^*$ ranges from $-b$ (blue) to $+b$ (yellow). In 1976, the CIE system further incorporates hue angle ($h^0$) and chroma ($C^*$) (see Formula 1 and 2). In the CIELAB color space, color difference ($\Delta E$) indicates the color difference between two color samples (see Formula 3). The greater the $\Delta E$, the greater the color difference between two color samples.

$$h^0 = \tan^{-1}(b^*/a^*) \quad \text{Formula 1}$$

$$C^* = (a^{*2} + b^{*2})^{1/2} \quad \text{Formula 2}$$

$$\Delta E = (\Delta L^{*2} + \Delta a^{*2} + \Delta b^{*2})^{1/2} \quad \text{Formula 3}$$

Therefore, when an ideal ink composition is used to conduct inkjet printing, it must provide ultimate color characteristics, such as good hue and high chroma.

Generally speaking, if the ink for inkjet printing includes only one colorant, it easily causes clogging at the nozzle. Therefore, many kinds of humectants are generally added. However, this frequently causes a slower drying rate and poor water-fastness. For example, in U.S. Pat. No. 4,631,085 (1986), U.S. Pat. No. 4,713,113 (1987), and U.S. Pat. No. 4,737,190 (1988), the ink includes a single colorant, and a humectant is required to prevent coagulation. U.S. Pat. No, 5,925,177 (1999) discloses an ink composition including Acid Yellow 23 dye, urea, and water. The addition of urea can prevent clogging of the nozzles resulting from crystallization of the yellow dye.

The ink composition for color inkjet printers generally includes four kinds of ink, magenta ink, cyan ink, yellow ink, and black ink, which are mainly water-based dyes. In recent years, the ink composition includes six kinds of ink, that is, magenta ink, cyan ink, yellow ink, black ink, light magenta ink, and light cyan ink, or seven kinds of ink with an additional light yellow ink. The ink composition includes at least one water-based (water-soluble) dye, water, an organic solvent, and other additives. However, such dye-based water-based ink has inferior water-fastness and light-fastness.

Thus, pigment-based inks with good water-fastness and light-fastness have been developed in recent years. Such ink includes at least one pigment, water, an organic solvent, and other additives. The inkjet ink using pigment as the colorant has better water-fastness and light-fastness than a dye-based ink. However, dispersants or adhesives must be added to the pigment-based ink. In addition, pigment has a larger particle size, which easily causes precipitation and coagulation, thus clogging the nozzle and negatively impacting printing properties.

SUMMARY OF THE INVENTION

One object of the present invention is to provide a water-soluble multicolor dye set and a multicolor inkjet ink composition with high chroma.

The second object of the present invention is to provide a novel water-soluble cyan dye set and a cyan inkjet ink composition including the dye set.

The third object of the present invention is to provide a novel water-soluble magenta dye set and a magenta inkjet ink composition including the dye set.

To achieve the above-mentioned objects, the water-soluble cyan dye set of the present invention includes Direct Blue 199 dye, Acid Blue 9 dye, and Direct Blue 87 dye.

The water-soluble magenta dye set of the present invention includes Reactive Red 158 dye, Reactive Red 159 dye, and Acid Red 92 dye.

The water-soluble multicolor dye set with high chroma of the present invention includes (1) Direct Blue 199 dye, Acid Blue 9 dye, and Direct Blue 87 dye; (2) Reactive Red 158 dye, Reactive Red 159 dye, and Acid Red 92 dye; and (3) Acid Yellow 23 dye and Direct Yellow 86 dye.

The inkjet ink composition of the present invention includes the above dye set, an aqueous solution, and other additives. The additives can be, but are not limited to, organic solvents, surfactants, pH buffer additives, chelating agents, biocides, humectants, preservatives, or UV blockers. The ink composition of the present invention has not only excellent light-fastness and water-fastness, but also broader color space and high quality color image.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
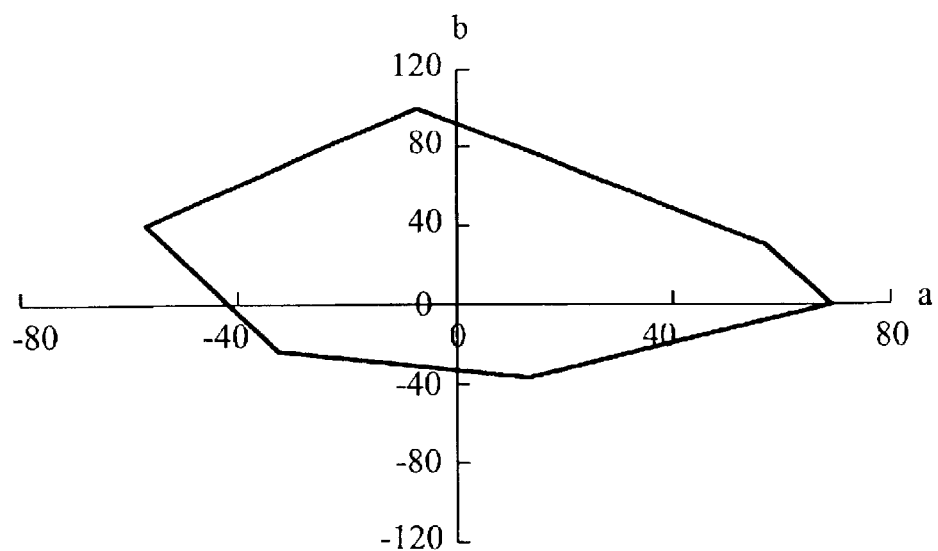
FIG. 1 is a color space diagram of print paper according to the Example of the present invention.

The present invention provides a water-soluble (water-based) multicolor dye set with high chroma and broad color space. The multicolor dye set includes the following components:

(1) A cyan dye set including: Direct Blue 199 dye, Acid Blue 9 dye, and Direct Blue 87 dye;

(2) A magenta dye set including: Reactive Red 158 dye, Reactive Red 159 dye, and Acid Red 92 dye; and (3) A yellow dye set including: Acid Yellow 23 dye and Direct Yellow 86 dye.

The present invention also provides an inkjet ink composition which includes the above-mentioned multicolor dye set and 50 to 95 weight % of an aqueous solution medium. Each dye is added in an amount of 0.1 to 10 weight %, preferably 2 to 5 weight %, based on the total weight of the ink composition.

In addition to water, the aqueous solution medium can further include a water-soluble or water-miscible organic solvent, such as cyclohexane, methanol, ethanol, ethylene glycol, diethylene glycol, triethylene glycol, polyethylene glycol, propylene glycol, butylene glycol, pentylene glycol, hexylene glycol, or polyhydroxy diols. The organic solvent can be added in an amount of 0.1 to 20 weight %, preferably 0.1 to 10 weight %, based on the weight of the medium.

The ink composition of the present invention can further include one or more kinds of a surfactant added in an amount of 0.01 to 30 weight %, more preferably 0.1 to 10 weight %, based on the weight of the medium. The surfactant can be anionic, cationic, non-ionic, or zwitterionic. Representative examples of the suitable surfactants include 2-propanol, di-1,2-propylene glycol, 2-pyrrolidone, N-methyl-2-pyrrolidone, 2,4,7,9-tetramethyl-5-decyne-4,7-diol, 1,1,1-trimethylolpropane, polyethandiol, polypropandiol, EO/PO copolymer, BO/EO copolymer, sodium dioctyl sulfosuccinate, alkylene oxide adduct of acetylene glycol, polybutyl resin, cellulose derivatives, styrene/acrylic copolymer resin, maleic acid/styrene copolymer, or polymers containing both hydrophilic and hydrophobic segments.

Commercially available surfactants include A-102 from CYTEC, LF-4 from CYTEC, 1,3-BG from KYOWA, OG from KYOWA, BEPG from KYOWA, PD-9 from KYOWA, EP-810 from AIR PRODUCT, CT-141 from AIR PRODUCT, CT-151 from AIR PRODUCT, OT-75 from CYTEC, GPG from CYTEC, and OT-70PG from CYTEC.

The ink composition of the present invention can further include a humectant. The humectant is usually a low volatile liquid and is used to decrease evaporation. Also, the humectant has good miscibility with the main solution. The addition of the humectant can prevent the ink at the nozzle of the ink cartridge from evaporation, which can generate precipitation and crystals, thus preventing clogging of the nozzle. Typical humectants used in the inkjet ink can be polyethylene glycol, diethylene glycol, or glycerol, added in an amount of 0.1 to 30.0 weight %, preferably 0.1 to 15 weight %, based on the weight of the medium.

The ink composition of the present invention can further include a pH buffer solution. The colorant can create ideal colors only within a suitable pH range. The pH buffer additive suitable for use can be diethanolamine, triethanolamine, hydroxides of alkali metal such as lithium hydroxide, sodium hydroxide, and potassium hydroxide, ammonium hydroxide, and carbonates of alkali metals such as lithium carbonate, sodium carbonate, and potassium carbonates.

The ink composition of the present invention can further include a chelating agent. The addition of the chelating agent can prevent generation of crystalline salts. This prevents coagulation of particles and clogging of the nozzle of the ink cartridge. Chelating agents suitable for use include sodium ethylenediaminetetraacetate, trisodium nitrilotriacetate, hydroxyethyl ethylenediamine trisodium acetate, diethylenetriamino pentasodium acetate, and uramil disodium acetate.

In addition, the ink composition of the present invention can further include a UV-blocker to block the absorbance of the UV light and increase the light-fastness of the colorant. A biocide or preservative can be added to inhibit the growth of microorganisms. A dispersant can be added to increase the dispersing ability of the additives in the ink.

The ink composition of the present invention has excellent light-fastness and water-fastness when used in thermal bubble inkjet printers. In addition, the dye set has special viscosity, good surface tension, broad color space, and high quality color image, greatly improving printing properties.

The following examples are intended to illustrate the process and the advantages of the present invention more fully without limiting its scope, since numerous modifications and variations will be apparent to those skilled in the art.

EXAMPLE

A three-color ink composition was prepared by mixing the following (1), (2), and (3) components. The symbol % indicates weight percent (weight %).

(1) 1.0% of Direct Blue 199 dye available from Clariant 1.0% of Acid Blue 9 dye available from Clariant 1.0% of Direct Blue 87 dye available from Orient, 4.0% of PEG200 (polyethylene glycol 200) available from U.C.C.

4.0% of 2-pyrrolidone available from ISP 4.0% of 2-ethyl-2-(hydroxymethyl)-1,3-propanediol (EHMPD) available from Lancaster 2.0% of surfactant 13-S-5 available from Sino-Japan Chemical Co. Ltd.

2.0% of surfactant 13-S-7 available from Sino-Japan Chemical Co. Ltd.

3.0% of surfactant OT-75 available from KYOWA 0.5% of surfactant 465 available from Air Product 1.0% of 1,4-butanediol available from Lancaster 1.0% of 1,6-hexanediol available from Lancaster 0.5% of biocide SL-700 available from KYOWA deionized water (2) 2.0% of Reactive Red 158 available from Bayer 0.5% of Reactive Red 159 available from Bayer 1.0% of Acid Red 92 available from Orient 4.0% of PEG 200 (polyethylene glycol 200) available from U.C.C.

4.0% of 2-pyrrolidone available from ISP 4.0% of 2-ethyl-2-(hydroxymethyl)-1,3-propanediol available from Lancaster 2.0% of surfactant 13-S-5 available from Sino-Japan Chemical Co. Ltd.

2.0% of surfactant 13-S-7 available from Sino-Japan Chemical Co. Ltd.

3.0% of surfactant OT-75 available from KYOWA 0.5% of surfactant 465 available from Air Product 1.0% of 1,4-butanediol available from Lancaster 1.0% of 1,6-hexanediol available from Lancaster 0.5% of biocide SL-700 available from KYOWA deionized water (3) 3.5% of Acid Yellow 23 dye available from Bayer 0.7% of Direct Yellow 86 dye available from Bayer 4.0% of PEG 200 (polyethylene glycol 200) available from U.C.C.

4.0% of 2-pyrrolidone available from ISP 4.0% of 2-ethyl-2-(hydroxymethyl)-1,3-propanediol available from Lancaster 2.0% of surfactant 13-S-5 available from Sino-Japan Chemical Co. Ltd.

2.0% of surfactant 13-S-7 available from Sino-Japan Chemical Co. Ltd.

3.0% of surfactant OT-75 available from KYOWA 0.5% of surfactant 465 available from Air Product 1.0% of 1,4-butanediol available from Lancaster 1.0% of 1,6-hexanediol available from Lancaster 0.5% of biocide SL-700 available from KYOWA deionized water Inkjet printing onto a commercially available plain paper in a commercially available inkjet printer proceeded using the above ink composition. The color space diagram of the as-printed paper is shown in FIG. 1.

Comparative Examples 1 to 3

The three-color ink compositions used in Comparative Examples 1 to 3 were the ink in a commercially available Hewlett-Packard C6578 color ink cartridge (Comparative Example 1), Epson S020193 color ink cartridge (Comparative Example 2), and Lexmark 12A1980 color ink cartridge (Comparative Example 3), respectively.

The paper used was commercially available plain paper. The printer used was a commercially available inkjet printer.

Figure 2:
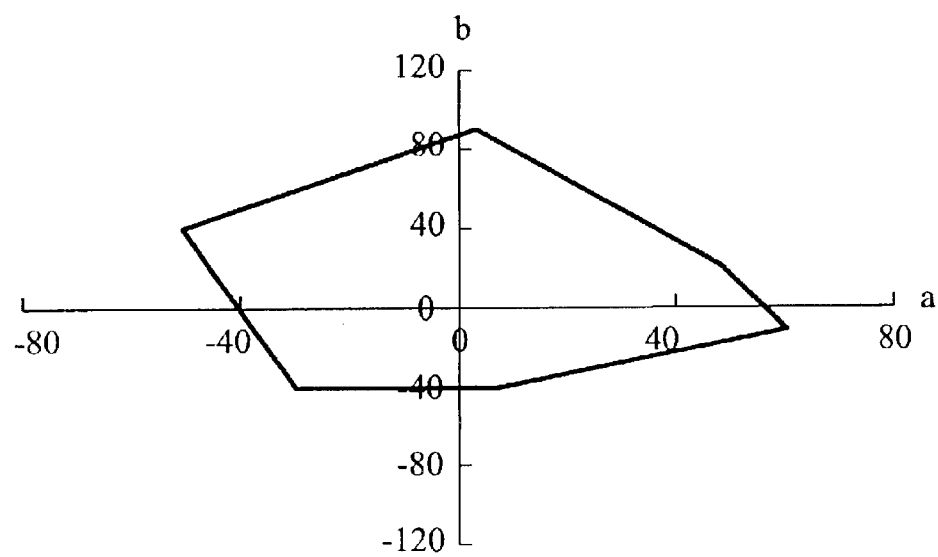
FIG. 2 is a color space diagram of print paper according to Comparative Example 1.
Figure 3:
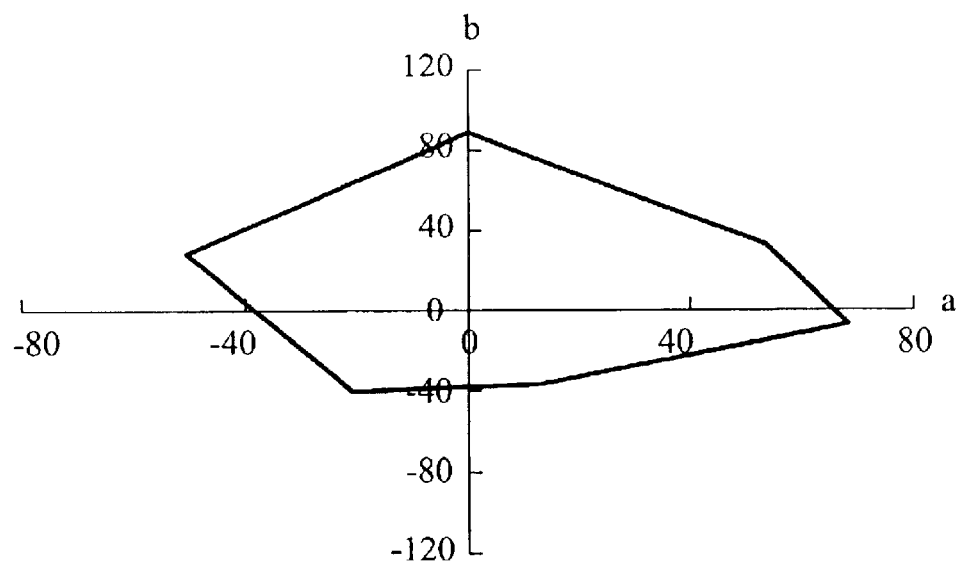
FIG. 3 is a color space diagram of print paper according to Comparative Example 2.
Figure 4:
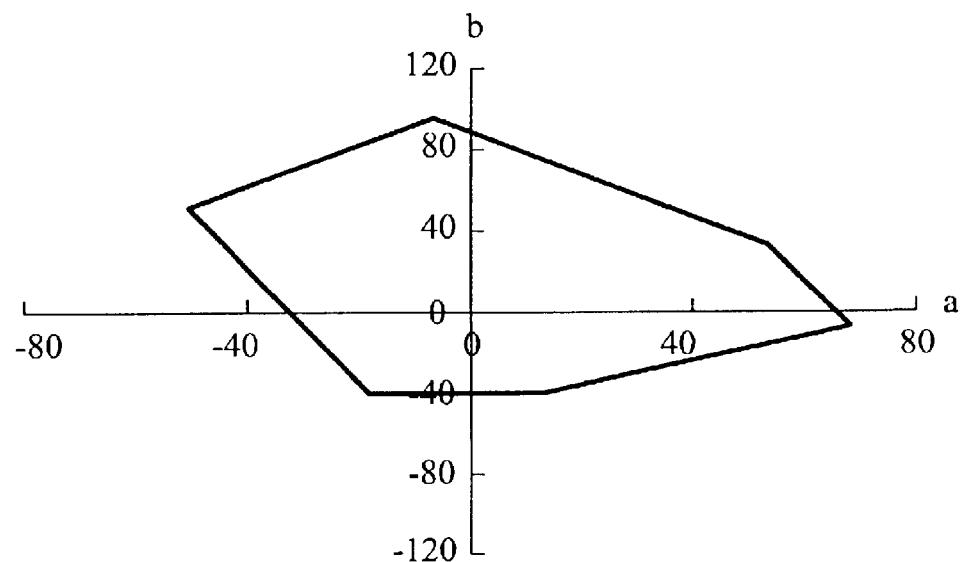
FIG. 4 is a color space diagram of print paper according to Comparative Example 3.

Inkjet printing was conducted onto the paper in the inkjet printer using the above ink compositions separately. The color space diagrams of the as-print paper are shown in FIG. 2 to 4 (Comparative Examples 1 to 3) respectively.

Figure 5:
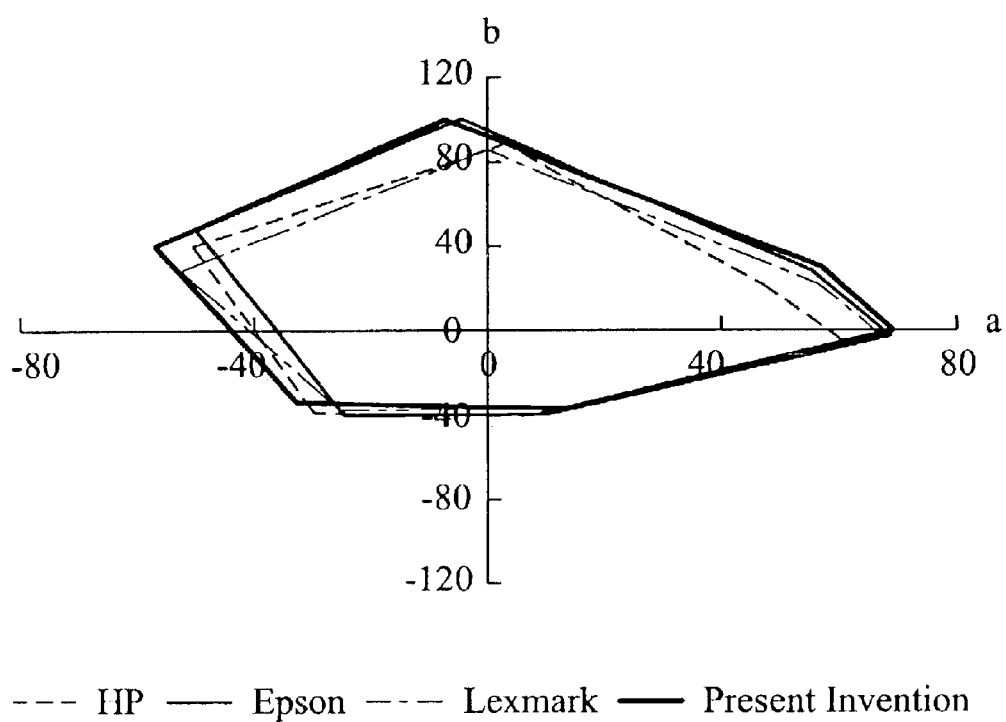
FIG. 5 shows the comparison between the color space diagrams of the printed paper of the Example and Comparative Examples 1 to 3.

The comparison between the color space diagrams of the printed paper of the Example and Comparative Examples 1 to 3 is shown in FIG. 5. It can be seen from FIG. 5 that the inkjet ink composition of the present invention provides a broader color space over the commercially available inkjet color ink.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A water-soluble dye set, comprising the following components:
    (1) Direct Blue 199 dye, Acid Blue 9 dye, and Direct Blue 87 dye;
    (2) Reactive Red 158 dye, Reactive Red 159 dye, and Acid Red 92 dye; and
    (3) Acid Yellow 23 dye and Direct Yellow 86 dye.

2. A water-soluble cyan dye set, comprising:
    Direct Blue 199 dye, Acid Blue 9 dye, and Direct Blue 87 dye.

3. A water-soluble magenta dye set, comprising:
    Reactive Red 158 dye, Reactive Red 159 dye, and Acid Red 92 dye.

4. An inkjet ink composition, comprising:
    (1) a cyan ink including Direct Blue 199 dye, Acid Blue 9 dye, and Direct Blue 87 dye;
    (2) a magenta ink including Reactive Red 158 dye, Reactive Red 159 dye, and Acid Red 92 dye; and
    (3) a yellow ink including Acid Yellow 23 dye and Direct Yellow 86 dye.

5. The inkjet ink composition as claimed in claim 4, wherein the cyan ink includes 0.1 to 10 weight % of Direct Blue 199 dye, 0.1 to 10 weight % of Acid Blue 9 dye, and 0.1 to 10 weight % of Direct Blue 87 dye.

6. The inkjet ink composition as claimed in claim 4, wherein the magenta ink includes 0.1 to 10 weight % of Reactive Red 158 dye, 0.1 to 10 weight % of Reactive Red 159 dye, and 0.1 to 10 weight % of Acid Red 92 dye.

7. The inkjet ink composition as claimed in claim 4, wherein the inkjet ink composition includes 50 to 95 weight % of an aqueous solution.

8. The inkjet ink composition as claimed in claim 4, further comprising an additive, wherein the additive is an organic solvent, surfactant, pH buffer solution, chelating agent, biocide, humectant, preservative, or UV-blocker.

9. The inkjet ink composition as claimed in claim 8, wherein the additive includes 0.1 to 20 weight % of an organic solvent.

10. The inkjet ink composition as claimed in claim 8, wherein the additive includes 0.01 to 30 weight % of a surfactant.

11. The inkjet ink composition as claimed in claim 8, wherein the additive includes 0.1 to 30 weight % of a humectant.

12. A cyan inkjet ink composition, comprising:
Direct Blue 199 dye, Acid Blue 9 dye, and Direct Blue 87 dye; and
an aqueous solution medium.

13. The cyan inkjet ink composition as claimed in claim 12, comprising: 0.1 to 10 weight % of Direct Blue 199 dye, 0.1 to 10 weight % of Acid Blue 9 dye, and 0.1 to 10 weight % of Direct Blue 87 dye.

14. The cyan inkjet ink composition as claimed in claim 12, wherein the aqueous solution medium is present in amount of 50 to 95 weight %.

15. The cyan inkjet ink composition as claimed in claim 12, further comprising an additive, wherein the additive is an organic solvent, surfactant, pH buffer solution, chelating agent, biocide, humectant, preservative, or UV-blocker.

16. The cyan inkjet ink composition as claimed in claim 15, wherein the additive includes 0.1 to 20 weight % of an organic solvent.

17. The cyan inkjet ink composition as claimed in claim 15, wherein the additive includes 0.01 to 30 weight % of a surfactant.

18. The cyan inkjet ink composition as claimed in claim 15, wherein the additive includes 0.1 to 30 weight % of a humectant.

19. A magenta inkjet ink composition, comprising:
Reactive Red 158 dye, Reactive Red 159 dye, and Acid Red 92 dye; and
an aqueous solution medium.

20. The magenta inkjet ink composition as claimed in claim 19, comprising 0.1 to 10 weight % of Reactive Red 158 dye, 0.1 to 10 weight % of Reactive Red 159 dye, and 0.1 to 10 weight % of Acid Red 92 dye.

21. The magenta inkjet ink composition as claimed in claim 19, wherein the aqueous solution medium is present in an amount of 50 to 95 weight %.

22. The magenta inkjet ink composition as claimed in claim 19, further comprising an additive, wherein the additive is an organic solvent, surfactant, pH buffer solution, chelating agent, biocide, humectant, preservative, or UV-blocker.

23. The magenta inkjet ink composition as claimed in claim 22, wherein the additive includes 0.1 to 20 weight % of an organic solvent.

24. The magenta inkjet ink composition as claimed in claim 22, wherein the additive includes 0.01 to 30 weight % of a surfactant.

25. The magenta inkjet ink composition as claimed in claim 22, wherein the additive includes 0.1 to 30 weight % of a humectant.

* * * * *